United States Patent
Wang et al.

(10) Patent No.: US 10,375,610 B2
(45) Date of Patent: Aug. 6, 2019

(54) FREQUENCY BAND SWITCHING METHOD AND TERMINAL

(71) Applicant: HUAWEI TECHNOLOGIES CO., LTD., Shenzhen, Guangdong (CN)

(72) Inventors: Tongbo Wang, Shanghai (CN); Weiqiang Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/579,866

(22) PCT Filed: Jun. 9, 2015

(86) PCT No.: PCT/CN2015/081091
§ 371 (c)(1),
(2) Date: Dec. 5, 2017

(87) PCT Pub. No.: WO2016/197331
PCT Pub. Date: Dec. 15, 2016

(65) Prior Publication Data
US 2018/0184346 A1 Jun. 28, 2018

(51) Int. Cl.
*H04W 36/06* (2009.01)
*H04W 36/08* (2009.01)
(Continued)

(52) U.S. Cl.
CPC ........... *H04W 36/08* (2013.01); *H04W 36/06* (2013.01); *H04W 76/10* (2018.02); *H04W 36/30* (2013.01); *H04W 84/12* (2013.01)

(58) Field of Classification Search
CPC ..... H04W 36/08; H04W 36/30; H04W 76/10; H04W 36/18
See application file for complete search history.

(56) References Cited

U.S. PATENT DOCUMENTS

| 2006/0073827 A1 | 4/2006 | Vaisanen et al. |
| 2006/0166677 A1* | 7/2006 | Derakshan ............ H04W 36/14 455/453 |

(Continued)

FOREIGN PATENT DOCUMENTS

| CN | 1720756 A | 1/2006 |
| CN | 102843302 A | 12/2012 |

(Continued)

OTHER PUBLICATIONS

International Search Report in International Application No. PCT/CN2015/081091, dated Mar. 9, 2016, 6 pages.

(Continued)

*Primary Examiner* — Mohammad S Anwar
(74) *Attorney, Agent, or Firm* — Fish & Richardson P.C.

(57) ABSTRACT

A frequency band switching method for a terminal includes: in response to determining that the terminal and a first access point (AP) transmit information by using a first frequency band, detecting a value of a channel quality parameter group, in response to determining that the value of the channel quality parameter group meets a preset condition, sending a connection request to a second AP, the connection request including a request for establishing a connection between the terminal and the second AP by using a second frequency band, and in response to determining that a success message fed back by the second AP according to the connection request is received, establishing, by the terminal, the connection with the second AP by using the second frequency band, and then sending a disconnection instruction to the first AP to break a connection between the terminal and the first AP.

19 Claims, 2 Drawing Sheets

(51) Int. Cl.
    *H04W 36/30*      (2009.01)
    *H04W 76/10*      (2018.01)
    *H04W 84/12*      (2009.01)

(56)             References Cited

U.S. PATENT DOCUMENTS

| | | | |
|---|---|---|---|
| 2006/0268799 A1* | 11/2006 | Huang | H04W 88/06 |
| | | | 370/338 |
| 2014/0003263 A1* | 1/2014 | Sheriff | H04W 36/30 |
| | | | 370/252 |
| 2014/0254400 A1* | 9/2014 | Zhou | H04L 1/0026 |
| | | | 370/252 |
| 2014/0307708 A1* | 10/2014 | Son | H04W 36/0055 |
| | | | 370/331 |
| 2014/0369353 A1 | 12/2014 | Desai et al. | |
| 2015/0055631 A1 | 2/2015 | Ghosh et al. | |
| 2017/0085278 A1 | 3/2017 | Emmanuel et al. | |

FOREIGN PATENT DOCUMENTS

| | | |
|---|---|---|
| CN | 103401577 A | 11/2013 |
| CN | 104579610 A | 4/2015 |
| CN | 104640011 A | 5/2015 |
| WO | 2014145073 A1 | 9/2014 |

OTHER PUBLICATIONS

Office Action issued in Chinese Application No. 201580080474.4 dated Jun. 6, 2019, 18 pages (with English translation).

* cited by examiner

FREQUENCY BAND SWITCHING METHOD AND TERMINAL

CROSS-REFERENCE TO RELATED APPLICATION

This application is a national stage of International Application No. PCT/CN2015/081091 filed on Jun. 9, 2015, which is hereby incorporated by reference in its entirety.

TECHNICAL FIELD

The present invention relates to the field of mobile communications technologies, and in particular, to a frequency band switching method and terminal.

BACKGROUND

A wireless fidelity (Wireless Fidelity, WiFi) technology is a generic term of technologies that support local area wireless network communication based on the IEEE 802.11 protocol family. A system mainly includes a station (STAtion, STA) and an access point (Access Point, AP). The STA and the AP communicate by using an air interface, that is, wireless transmission. The AP connects the STA to a local area network in the Internet, so that the STA can access the Internet.

There are two frequency bands commonly used for the WiFi: one is a 2.4 G frequency band, and the other is a 5 G frequency band. In an existing communication method, dual-band AP switching is completed by means of hard handover. For example, when a STA is currently connected to a 2.5 G AP, the currently connected 2.5 G AP needs to be first manually disconnected, and then a 5 G AP is manually selected and connected. Therefore, a switching manner is quite inflexible.

SUMMARY

In view of this, embodiments of the present invention provide a frequency band switching method and terminal, so as to resolve a problem of inflexible network switching in a multi-frequency system.

To achieve the foregoing objective, the embodiments of the present invention use the following technical solutions.

According to a first aspect, a frequency band switching method is provided, where the method is applied to a terminal that supports WiFi communication on at least two frequency bands, and the method includes:

when the terminal and a first AP transmit information by using a first frequency band, detecting a value of a channel quality parameter group, where the channel quality parameter group includes at least one channel quality parameter, and the channel quality parameter is used to indicate channel quality when the terminal and the first AP transmit the information by using the first frequency band;

when the value of the channel quality parameter group meets a preset condition, sending a connection request to a second AP, where the connection request includes a request for establishing a connection between the terminal and the second AP by using a second frequency band; and when a success message that is fed back by the second AP according to the connection request is received, establishing, by the terminal, a connection with the second AP by using the second frequency band, and then sending a disconnection instruction to the first AP, where the disconnection instruction is used to break a connection between the terminal and the first AP.

With reference to the first aspect, in a first possible implementation of the first aspect, the channel quality parameter includes a received signal strength indicator RSSI, a physical layer working rate RATE, and a packet error rate PER; and the channel quality parameter group includes at least one of the RSSI, the RATE, or the PER, or a combination thereof.

With reference to the first aspect, in a second possible implementation of the first aspect, the channel quality parameter group includes an RSSI, a RATE, and a PER.

With reference to the second possible implementation of the first aspect, in a third possible implementation, when the first frequency band is higher than the second frequency band, the preset condition includes: a value R of the RSSI is less than a received signal strength indicator switching threshold R1, a value T of the RATE is less than a physical layer working rate threshold T1, and a value V of the PER is greater than a packet error rate threshold V1.

With reference to the third possible implementation of the first aspect, in a fourth possible implementation, the first frequency band is 5 GHz, and the second frequency band is 2.4 GHz.

With reference to the second possible implementation of the first aspect, in a fifth possible implementation, when the first frequency band is lower than the second frequency band, the preset condition includes: a value R of the RSSI is greater than a received signal strength indicator switching threshold R2, a value T of the RATE is greater than a physical layer working rate threshold T2, and a value V of the PER is less than a packet error rate threshold V2.

With reference to the fifth possible implementation of the first aspect, in a sixth possible implementation, the first frequency band is 2.4 GHz, and the second frequency band is 5 GHz.

According to a second aspect, a frequency band switching terminal is provided, where the terminal includes: a communications module, where the communications module supports WiFi communication on at least two frequency bands;

a detection module, configured to: when the terminal and a first AP transmit information by using a first frequency band, detect a value of a channel quality parameter group, where the channel quality parameter group includes at least one channel quality parameter, and the channel quality parameter is used to indicate channel quality when the terminal and the first AP transmit the information by using the first frequency band;

a request module, configured to: when the value of the channel quality parameter group meets a preset condition, send a connection request to a second AP, where the connection request includes a request for establishing a connection between the terminal and the second AP by using a second frequency band; and a connectivity module, configured to: when a success message that is fed back by the second AP according to the connection request is received, establish a connection by the terminal with the second AP by using the second frequency band, and then send a disconnection instruction to the first AP, where the disconnection instruction is used to break a connection between the terminal and the first AP.

According to a third aspect, a frequency band switching terminal is provided, where the terminal includes a memory and a processor, where the processor is configured to:

when the terminal and a first AP transmit information by using a first frequency band, detect a value of a channel quality parameter group, where the channel quality parameter group includes at least one channel quality parameter, and the channel quality parameter is used to indicate channel quality when the terminal and the first AP transmit the information by using the first frequency band;

when the value of the channel quality parameter group meets a preset condition, send a connection request to a second AP, where the connection request includes a request for establishing a connection between the terminal and the second AP by using a second frequency band; and when a success message that is fed back by the second AP according to the connection request is received, establish a connection by the terminal with the second AP by using the second frequency band, and then send a disconnection instruction to the first AP, where the disconnection instruction is used to break a connection between the terminal and the first AP.

The embodiments of the present invention provide a frequency band switching method and terminal. A channel quality parameter group is detected, and when it is detected that the channel quality parameter group meets a preset condition, a STA is triggered to automatically switch between multi-frequency APs.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

In addition, it should be noted that the accompanying drawings are merely examples, and are not drawn to scale. For ease of description, some dimensions may be enlarged, and other dimensions may be reduced.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A terminal (station) in the following descriptions and accompanying drawings is mainly a mobile phone. However, it should be understood that the present invention is not limited to this application, and may be applied to many other communications terminals that are designed according to solutions provided in the embodiments of the present invention, including a mobile phone, a tablet computer, an e-reader, a communicator, an e-manager, a smartphone, a PDA personal digital assistant, an in-vehicle radio communications apparatus, a computer, a printer, a fax machine, and the like.

Figure 1:
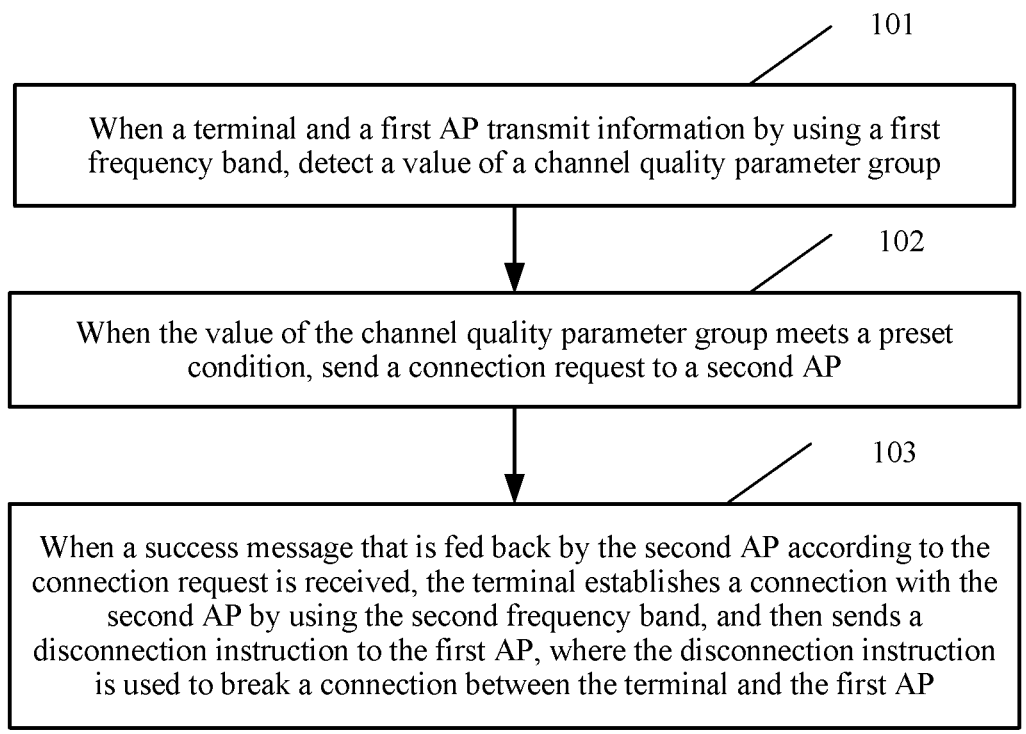
FIG. 1 is a flowchart of a frequency band switching method according to an embodiment of the present invention.

FIG. 1 shows a frequency band switching method provided in an embodiment of the present invention. The method is applied to a terminal that supports WiFi communication on at least two different frequency bands.

101. When the terminal and a first AP transmit information by using a first frequency band, detect a value of a channel quality parameter group, where the channel quality parameter group includes at least one channel quality parameter, and the channel quality parameter is used to indicate channel quality when the terminal and the first AP transmit the information by using the first frequency band.

102. When the value of the channel quality parameter group meets a preset condition, send a connection request to a second AP, where the connection request includes a request for establishing a connection between the terminal and the second AP by using a second frequency band.

103. When a success message that is fed back by the second AP according to the connection request is received, the terminal establishes a connection with the second AP by using the second frequency band, and then sends a disconnection instruction to the first AP, where the disconnection instruction is used to break a connection between the terminal and the first AP.

The channel quality parameter includes a received signal strength indicator (received signal strength indicator, RSSI), a physical layer working rate RATE, and a packet error rate PER.

The RSSI is used to determine the channel quality, and whether broadcast sending strength needs to be increased.

The physical layer working rate RATE is used to determine a speed of channel transmission.

The packet error rate PER is used to determine accuracy of the channel transmission.

The channel quality parameter group includes at least one of the RSSI, the RATE, or the PER, or a combination thereof.

To reduce a ping-pong effect, the channel quality parameter group may include the RSSI, the RATE, and the PER.

When the first frequency band is higher than the second frequency band, for example, when the first frequency band is 5 GHz, and the second frequency band is 2.4 GHz, optionally, the preset condition includes: a value R of the RSSI is less than a received signal strength indicator switching threshold R1, a value T of the RATE is less than a physical layer working rate threshold T1, and a value V of the PER is greater than a packet error rate threshold V1.

When the first frequency band is lower than the second frequency band, for example, when the first frequency band is 2.4 GHz, and the second frequency band is 5 GHz, optionally, the preset condition includes: a value R of the RSSI is greater than a received signal strength indicator switching threshold R2, a value T of the RATE is greater than a physical layer working rate threshold T2, and a value V of the PER is less than a packet error rate threshold V2.

For example, the first frequency band is 2.4 GHz, and the second frequency band is 5 GHz.

When a mobile phone that supports 2.4/5 GHz connection and a 2.4 GHz AP transmit information by using 2.4 GHz, the mobile phone detects values of the RSSI, the RATE, and the PER.

When it is detected that the value R of the RSSI is greater than the received signal strength indicator switching threshold R2, the value T of the RATE is greater than the physical layer working rate threshold T2, and the value V of the PER is less than the packet error rate threshold V2, the mobile phone sends, to a 5 GHz AP, a connection request for establishing a connection between the mobile phone and the 5 GHz AP by using 5 GHz.

When a success message that is fed back by the 5 GHz AP according to the connection request is received, the terminal establishes a connection with the 5 GHz AP by using the 5 GHz, and then sends, to the 2.4 GHz AP, a disconnection instruction of breaking a connection between the mobile phone and the 2.4 GHz AP.

It may be understood that a 5 GHz signal has advantages of a wide frequency band, little interference, and a high throughput rate, but a wall penetration capability of the 5 GHz signal is poor. In contrast, a 2.4 GHz signal has a narrower frequency band, but has an advantage of a wide coverage area. Generally, a channel quality requirement for transmitting a 5 GHz signal is higher than that for transmitting a 2.4 GHz signal. According to the method in the foregoing embodiment, when the mobile phone works at 2.4 GHz, if R>R2, T>T2, and V<V2, it indicates that the channel quality is relatively good, and the mobile phone is relatively close to the AP. In this case, switching an operating frequency band to 5 GHz may improve the throughput rate while ensuring communication quality. However, when the mobile phone works at 5 GHz, if the mobile phone is gradually far away from the AP, the channel quality gradually becomes poor. In this case, switching the frequency band to 2.4 GHz ensures long distance coverage of a signal.

Optionally, when a link packet error rate PER is statistically collected, volume-weighted exponential moving average (V-EMA) may be used. According to the method, weighted averaging is performed on a value at a current moment and a historical value, so as to effectively smooth signal fluctuation caused by an air interface deviation.

In this embodiment of the present invention, the terminal that supports WiFi communication on the at least two different frequency bands includes a first antenna and a second antenna. Optionally, an operating frequency of the first antenna is around 2.4 GHz, and an operating frequency of the second antenna is around 5 GHz. The first antenna and the second antenna are separately connected to a radio frequency circuit. The first antenna and the second antenna may be separate antennas, or may be an antenna array. Optionally, when the terminal and the first AP transmit the information by using the first frequency band, the first antenna works; when the terminal and the second AP transmit the information by using the second frequency band, the second antenna works; and when the terminal establishes the connection with the second AP by using the second frequency band, and does not send the disconnection instruction to the first AP, both the first antenna and the second antenna work.

According to the frequency band switching method provided in this embodiment of the present invention, a value of a channel quality parameter group is detected, and when the value of the channel quality parameter group meets a preset condition, automatic switching of an AP is triggered, thereby improving flexibility of system switching.

Figure 2:
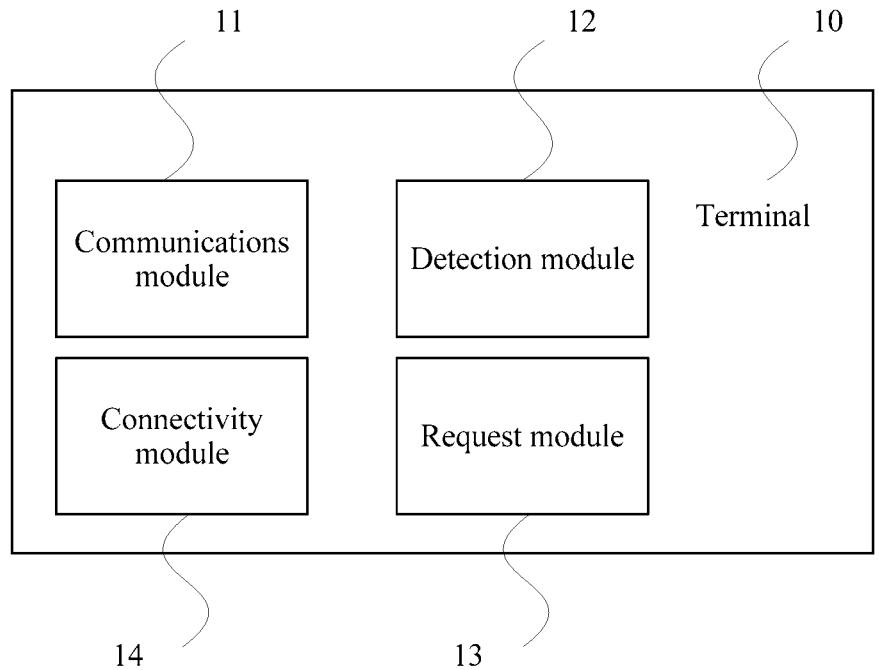
FIG. 2 is a schematic structural diagram of a frequency band switching terminal according to an embodiment of the present invention.

FIG. 2 shows a frequency band switching terminal provided in an embodiment of the present invention.

A terminal 10 includes: a communications module 11, where the communications module supports WiFi communication on at least two different frequency bands;

a detection module 12, configured to: when the terminal 10 and a first AP transmit information by using a first frequency band, detect a value of a channel quality parameter group, where the channel quality parameter group includes at least one channel quality parameter, and the channel quality parameter is used to indicate channel quality when the terminal and the first AP transmit the information by using the first frequency band;

a request module 13, configured to: when the value of the channel quality parameter group meets a preset condition, send a connection request to a second AP, where the connection request includes a request for establishing a connection between the terminal and the second AP by using a second frequency band; and a connectivity module 14, configured to: when a success message that is fed back by the second AP according to the connection request is received, establish a connection by the terminal with the second AP by using the second frequency band, and then send a disconnection instruction to the first AP, where the disconnection instruction is used to break a connection between the terminal and the first AP.

The channel quality parameter includes a received signal strength indicator (received signal strength indicator, RSSI), a physical layer working rate RATE, and a packet error rate PER.

The RSSI is used to determine the channel quality, and whether broadcast sending strength needs to be increased.

The physical layer working rate RATE is used to determine a speed of channel transmission.

The packet error rate PER is used to determine accuracy of the channel transmission.

The channel quality parameter group includes at least one of the RSSI, the RATE, or the PER, or a combination thereof.

To reduce a ping-pong effect, the channel quality parameter group includes the RSSI, the RATE, and the PER.

For example, the first frequency band is 5 GHz, and the second frequency band is 2.4 GHz.

When a mobile phone that supports 2.4/5 GHz connection and a 5 GHz AP transmit information by using 5 GHz, the mobile phone detects values of the RSSI, the RATE, and the PER.

When the detection module 12 detects that a value R of the RSSI is less than a received signal strength indicator switching threshold R1, a value T of the RATE is less than a physical layer working rate threshold T1, and a value V of the PER is greater than a packet error rate threshold V1, the request module 13 sends, to a 2.4 GHz AP, a connection request for establishing a connection between the mobile phone and the 2.4 GHz AP by using 2.4 GHz.

When a success message that is fed back by the 2.4 GHz AP according to the connection request is received, the connectivity module 14 establishes a connection with the 2.4 GHz AP by using the 2.4 GHz, and then sends, to the 5 GHz AP, a disconnection instruction of breaking a connection between the mobile phone and the 5 GHz AP.

It should be noted that the foregoing modules are flexible in an implementation, and may be isolated circuits, or may be partially or completely integrated into a chip. This is not limited in this embodiment of the present invention.

In this embodiment of the present invention, the terminal that supports WiFi communication on the at least two different frequency bands includes a first antenna and a second antenna. Optionally, an operating frequency of the first antenna is around 2.4 GHz, and an operating frequency of the second antenna is around 5 GHz. The first antenna and the second antenna are separately connected to a radio frequency circuit. The first antenna and the second antenna may be separate antennas, or may be an antenna array. Optionally, when the terminal and the first AP transmit the information by using the first frequency band, the first antenna works; when the terminal and the second AP transmit the information by using the second frequency band, the second antenna works; and when the terminal establishes the connection with the second AP by using the second frequency band, and does not send the disconnection instruction to the first AP, both the first antenna and the second antenna work.

According to the frequency band switching terminal provided in this embodiment of the present invention, a value of a channel quality parameter group is detected, and when the value of the channel quality parameter group meets a preset condition, automatic switching of an AP is triggered, thereby improving flexibility of system switching.

Figure 3:
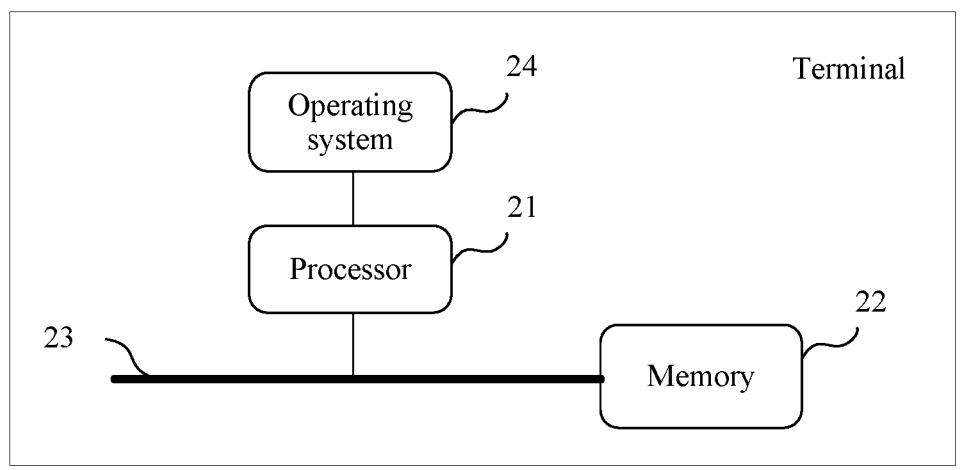
FIG. 3 is a schematic structural diagram of a frequency band switching terminal according to an embodiment of the present invention.

FIG. 3 shows a frequency band switching terminal provided in an embodiment of the present invention. The terminal includes a processor 21 (such as a CPU), a memory 22, at least one communications bus 23, and an operating system 24 that runs on hardware.

The communications bus 23 is configured to implement communication connection between components. The memory 22 may include a high-speed RAM memory, and may further include a non-volatile memory NVM, such as at least one disk memory. The memory may store various programs, which are used to complete various processing functions and implement method steps in this embodiment. The processor 21 is configured to read a computer program from the memory 22, and is configured to perform the following operations, which are specifically:

when the terminal and a first AP transmit information by using a first frequency band, detecting a value of a channel quality parameter group, where the channel quality parameter group includes at least one channel quality parameter, and the channel quality parameter is used to indicate channel quality when the terminal and the first AP transmit the information by using the first frequency band;

when the value of the channel quality parameter group meets a preset condition, sending a connection request to a second AP, where the connection request includes a request for establishing a connection between the terminal and the second AP by using a second frequency band; and when a success message that is fed back by the second AP according to the connection request is received, establishing a connection by the terminal with the second AP by using the second frequency band, and then sending a disconnection instruction to the first AP, where the disconnection instruction is used to break a connection between the terminal and the first AP.

The terminal provided in this embodiment of the present invention can execute the foregoing method embodiments. Implementation principles and technical effects of the terminal are similar, and details are not described herein again.

The channel quality parameter includes a received signal strength indicator (received signal strength indicator, RSSI), a physical layer working rate RATE, and a packet error rate PER.

The RSSI is used to determine the channel quality, and whether broadcast sending strength needs to be increased.

The physical layer working rate RATE is used to determine a speed of channel transmission.

The packet error rate PER is used to determine accuracy of the channel transmission.

The channel quality parameter group includes at least one of the RSSI, the RATE, or the PER, or a combination thereof.

Further, to reduce a ping-pong effect, the channel quality parameter group includes the RSSI, the RATE, and the PER.

When the first frequency band is higher than the second frequency band, for example, when the first frequency band is 5 GHz, and the second frequency band is 2.4 GHz, optionally, the preset condition includes: a value R of the RSSI is less than a received signal strength indicator switching threshold R1, a value T of the RATE is less than a physical layer working rate threshold T1, and a value V of the PER is greater than a packet error rate threshold V1.

When the first frequency band is lower than the second frequency band, for example, when the first frequency band is 2.4 GHz, and the second frequency band is 5 GHz, optionally, the preset condition includes: a value R of the RSSI is greater than a received signal strength indicator switching threshold R2, a value T of the RATE is greater than a physical layer working rate threshold T2, and a value V of the PER is less than a packet error rate threshold V2.

According to the frequency band switching terminal provided in this embodiment of the present invention, a value of a channel quality parameter group is detected, and when the value of the channel quality parameter group meets a preset condition, automatic switching of an AP is triggered, thereby improving flexibility of system switching.

In the foregoing embodiments, the description of each embodiment has respective focuses. For a part that is not described in detail in an embodiment, reference may be made to related descriptions in other embodiments.

It should be noted that in this specification, unless otherwise specified, relational terms such as first and second are used only to distinguish one entity or operation from another, and do not necessarily require or imply that any actual relationship or sequence exists between these entities or operations.

It should be noted that in some embodiments of the present invention, the mentioned "unit" is a combination of hardware and/or software that can implement a corresponding function, that is, implementations of the hardware, the software, or the combination of the hardware and the software are all conceivable.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A frequency band switching method for a terminal supporting WiFi communication on at least two frequency bands, the method comprising:
in response to determining that the terminal and a first access point (AP) transmit information by using a first frequency band, detecting a value of a channel quality parameter group of the first frequency band, wherein the channel quality parameter group of the first frequency band comprises at least one channel quality parameter, the at least one channel quality parameter indicating a channel quality of the first frequency band;

in response to determining, by the terminal, that the value of the channel quality parameter group of the first frequency band detected by the terminal meets a preset condition, sending a connection request to a second AP while the terminal is connected with the first AP by using the first frequency band, wherein the connection request comprises a request for establishing a connection between the terminal and the second AP by using a second frequency band; and in response to determining that a success message fed back by the second AP according to the connection request is received, establishing, by the terminal, the connection with the second AP by using the second frequency band, and then sending a disconnection instruction to the first AP to break a connection between the terminal and the first AP.

2. The method according to claim 1, wherein the at least one channel quality parameter comprises a received signal strength indicator (RSSI), a physical layer working rate (RATE), and a packet error rate (PER); and wherein the channel quality parameter group comprises at least one of the RSSI, the RATE, or the PER.

3. The method according to claim 2, wherein detecting a value of a channel quality parameter group comprises:
collecting the PER by performing volume-weighted exponential moving average.

4. The method according to claim 1, wherein the channel quality parameter group comprises an RSSI, a RATE, and a PER.

5. The method according to claim 4, wherein, when the first frequency band is higher than the second frequency band, the preset condition comprises:
a value R of the RSSI is less than a received signal strength indicator switching threshold R1,
a value T of the RATE is less than a physical layer working rate threshold T1, and
a value V of the PER is greater than a packet error rate threshold V1.

6. The method according to claim 5, wherein the first frequency band comprises 5 GHz, and the second frequency band comprises 2.4 GHz.

7. The method according to claim 4, wherein, when the first frequency band is lower than the second frequency band, the preset condition comprises:
a value R of the RSSI is greater than a received signal strength indicator switching threshold R2,
a value T of the RATE is greater than a physical layer working rate threshold T2, and
a value V of the PER is less than a packet error rate threshold V2.

8. The method according to claim 7, wherein the first frequency band comprises 2.4 GHz, and the second frequency band comprises 5 GHz.

9. A frequency band switching terminal supporting WiFi communication on at least two frequency bands, the terminal comprising:
at least one processor; and
a non-transitory computer-readable storage medium coupled to the at least one processor and storing programming instructions for execution by the at least one processor, wherein the programming instructions instruct the at least one processor to:
in response to determining that information is transmitted with a first access point (AP) by using a first frequency band, detect a value of a channel quality parameter group of the first frequency band, wherein the channel quality parameter group of the first frequency band comprises at least one channel quality parameter, the at least one channel quality parameter indicating a channel quality of the first frequency band, in response to determining that the value of the channel quality parameter group of the first frequency band detected by the terminal meets a preset condition, send a connection request to a second AP while the terminal is connected with the first AP by using the first frequency band, wherein the connection request comprises a request for establishing a connection with the second AP by using a second frequency band, and in response to determining that a success message fed back by the second AP according to the connection request is received, establish the connection with the second AP by using the second frequency band, and then send a disconnection instruction to the first AP, wherein the disconnection instruction is used to break a connection with the first AP.

10. The frequency band switching terminal according to claim 9, wherein the at least one channel quality parameter comprises a received signal strength indicator (RSSI), a physical layer working rate (RATE), and a packet error rate (PER), and wherein the channel quality parameter group comprises at least one of the RSSI, the RATE, or the PER.

11. The frequency band switching terminal according to claim 10, wherein the programming instructions instruct the at least one processor to:
collect the PER by performing volume-weighted exponential moving average.

12. The frequency band switching terminal according to claim 9, wherein the channel quality parameter group comprises an RSSI, a RATE, and a PER.

13. The frequency band switching terminal according to claim 12, wherein, when the first frequency band is higher than the second frequency band, the preset condition comprises:
a value R of the RSSI is less than a received signal strength indicator switching threshold R1,
a value T of the RATE is less than a physical layer working rate threshold T1, and
a value V of the PER is greater than a packet error rate threshold V1.

14. The frequency band switching terminal according to claim 13, wherein the first frequency band comprises 5 GHz, and the second frequency band comprises 2.4 GHz.

15. The frequency band switching terminal according to claim 12, wherein, when the first frequency band is lower than the second frequency band, the preset condition comprises:
a value R of the RSSI is greater than a received signal strength indicator switching threshold R2,
a value T of the RATE is greater than a physical layer working rate threshold T2, and
a value V of the PER is less than a packet error rate threshold V2.

16. The frequency band switching terminal according to claim 15, wherein the first frequency band comprises 2.4 GHz, and the second frequency band comprises 5 GHz.

17. The frequency band switching terminal according to claim 9, further comprising:

a first antenna having a first operating frequency around the first frequency band; and a second antenna having a second operating frequency around the second frequency band.

18. The frequency band switching terminal according to claim 17, further comprising a radio frequency circuit separately connected to the first antenna and the second antenna.

19. The frequency band switching terminal according to claim 17, wherein the programming instructions instruct the at least one processor to:

operate the first antenna when using the first frequency band to transmit the information with the first AP, operate the second antenna when using the second frequency band to transmit second information with the second AP, and operate the first antenna and the second antenna when establishing the connection with the second AP by using the second frequency band and before sending the disconnection instruction to the first AP by using the first frequency band.

* * * * *